Figure 12:
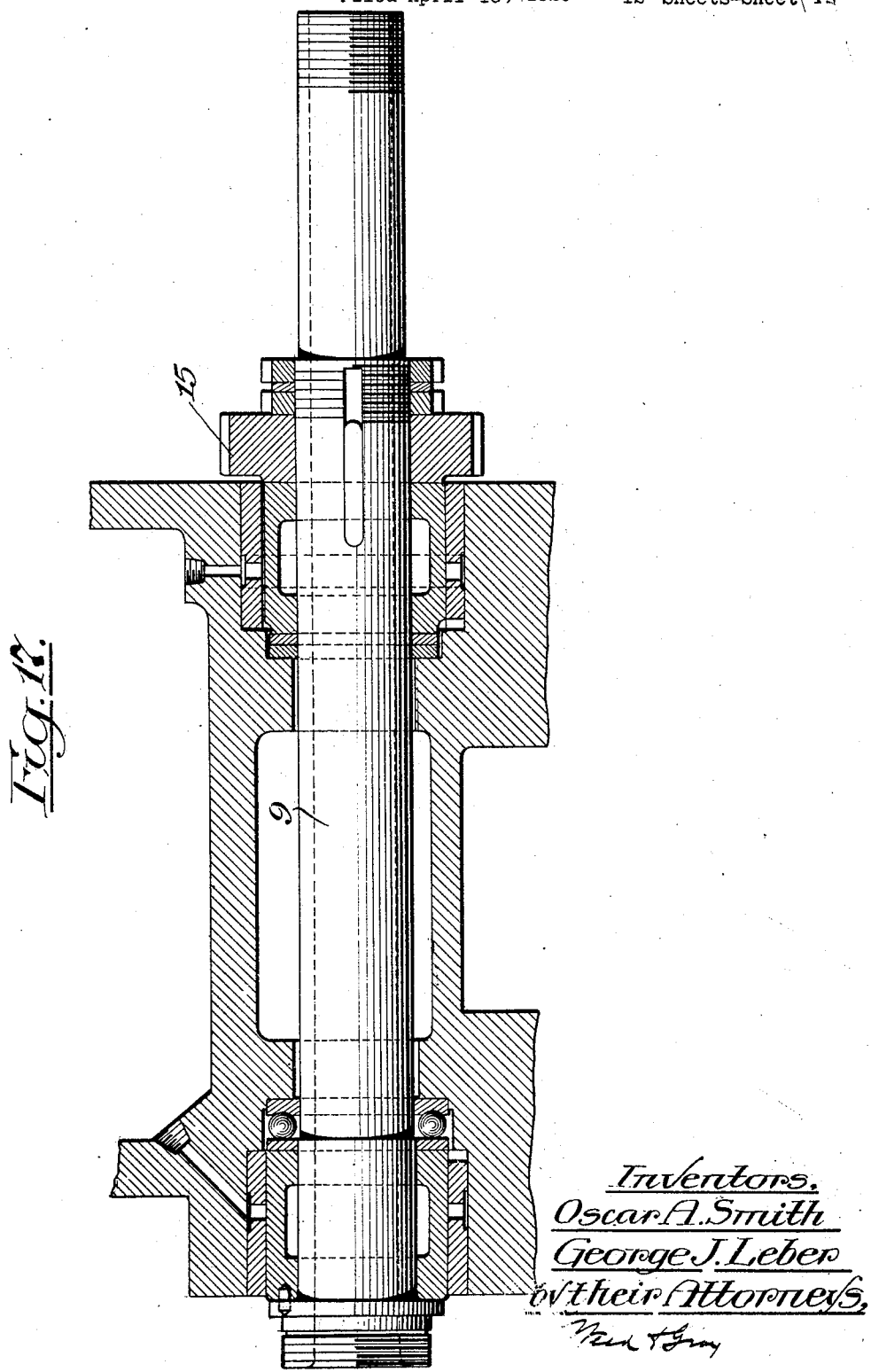

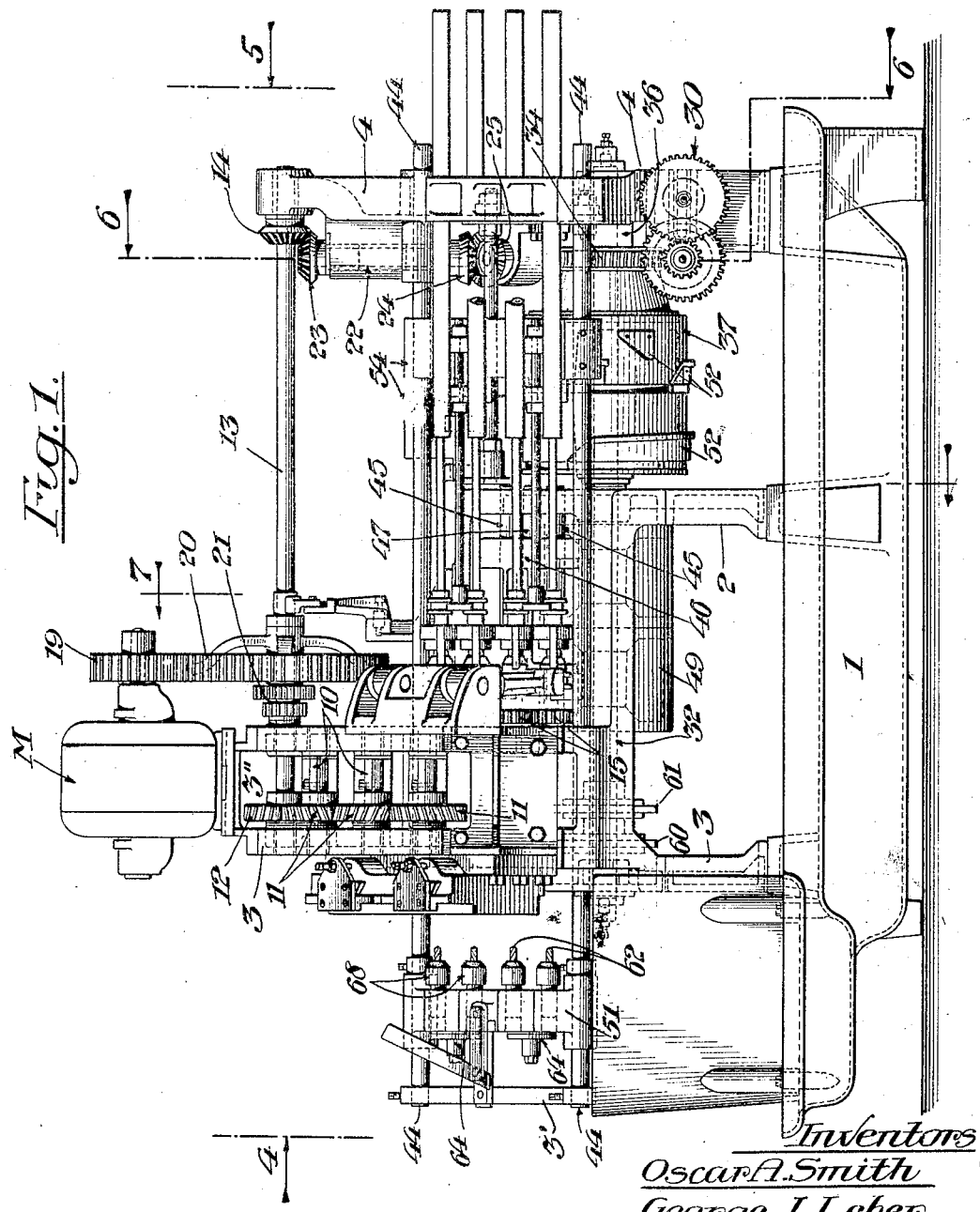

May 26, 1925.  
O. A. SMITH ET AL  
1,539,440

NUT FORMING AND DRILLING MACHINE

Filed April 13, 1923    12 Sheets-Sheet 2

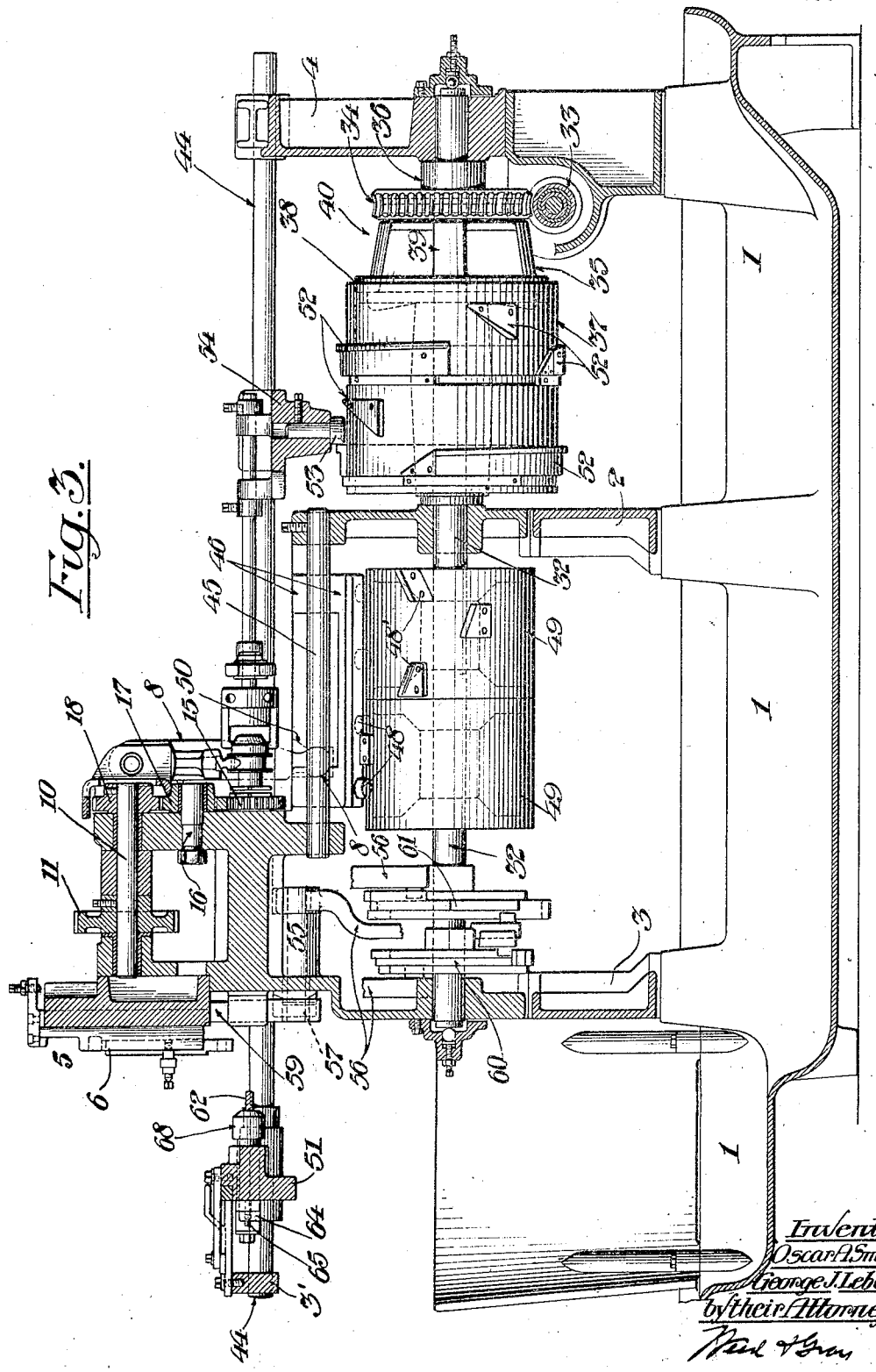

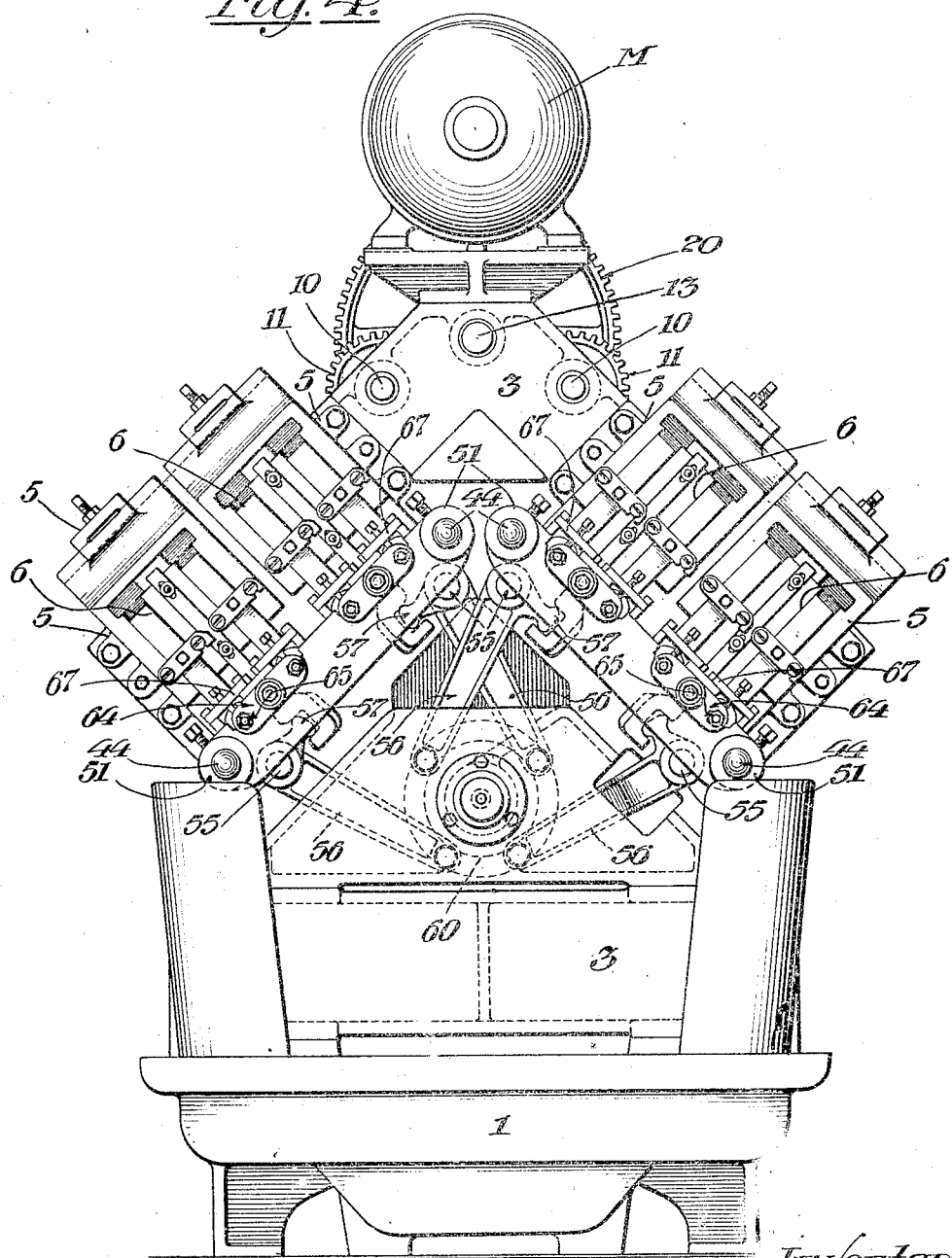

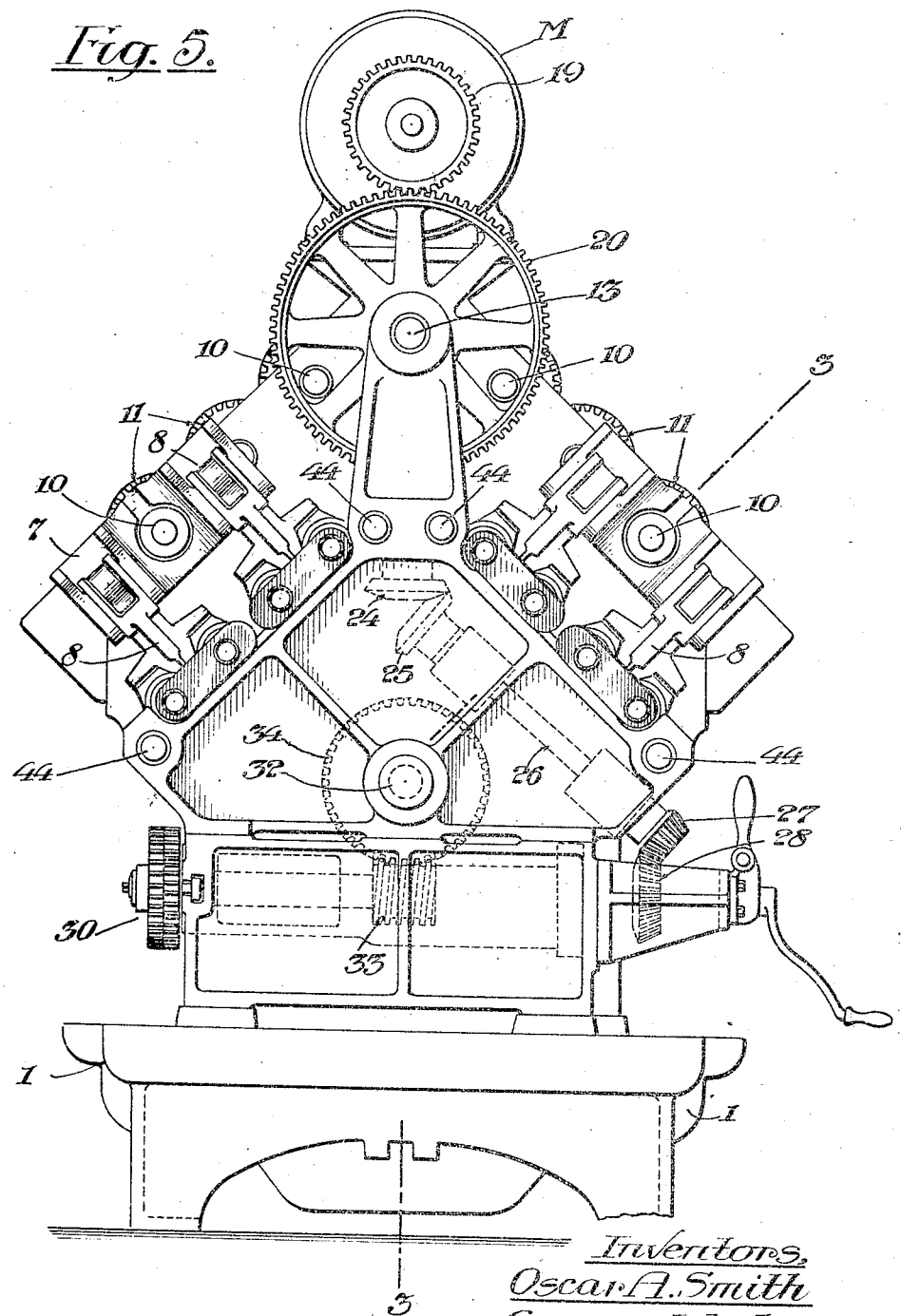

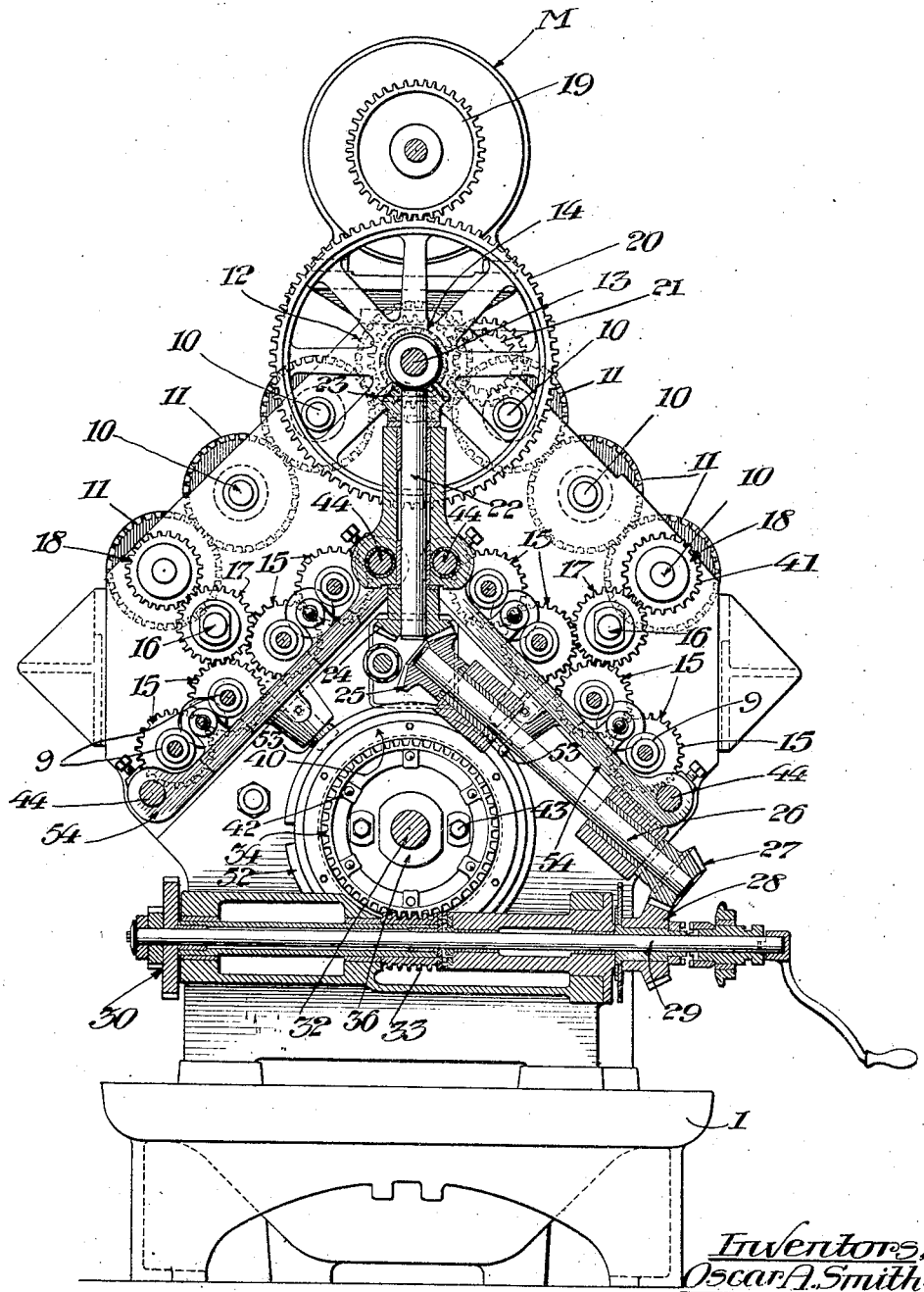

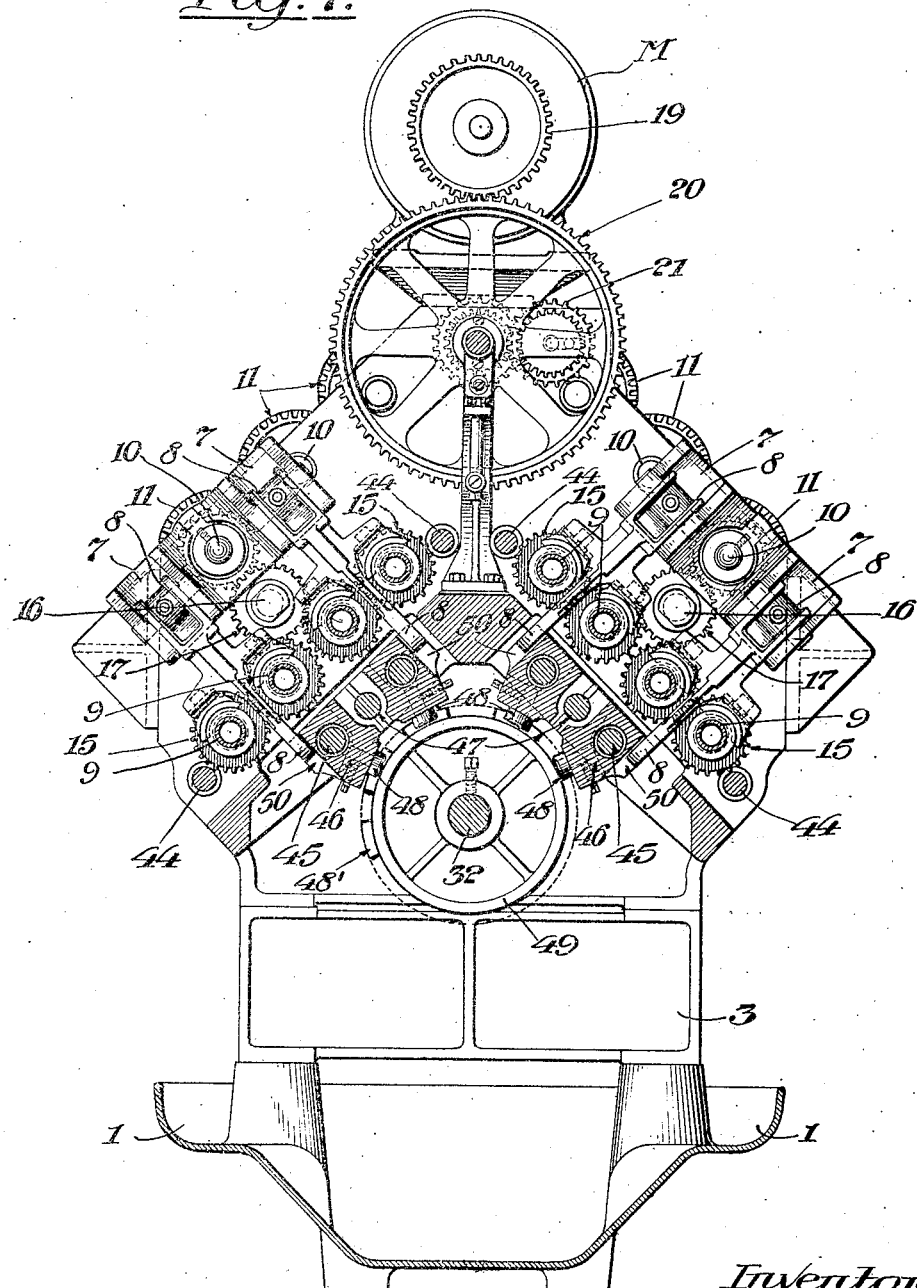

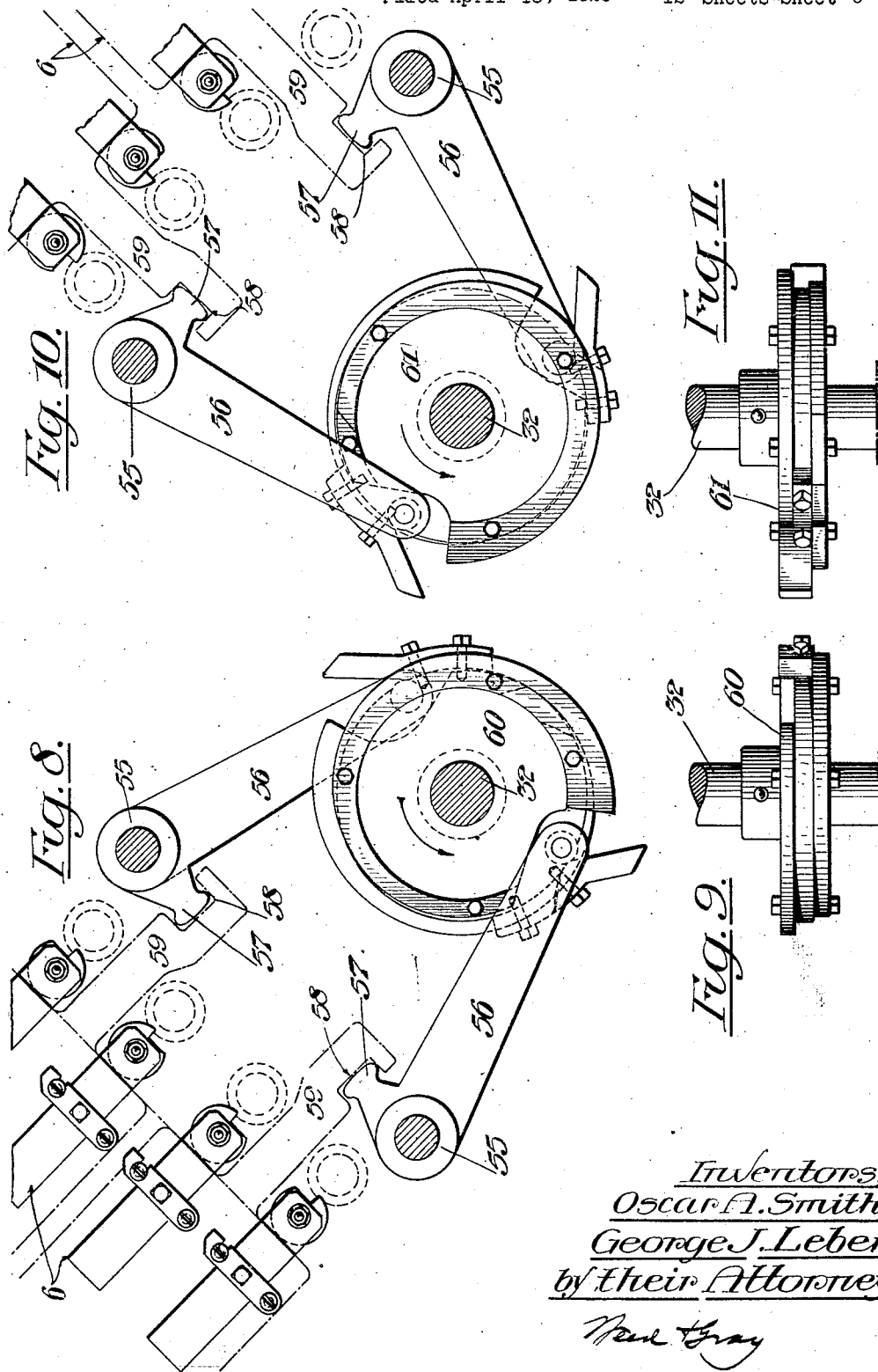

May 26, 1925.　　　　　　　　　　　　　　　　　　　1,539,440
O. A. SMITH ET AL
NUT FORMING AND DRILLING MACHINE
Filed April 13, 1923　　12 Sheets-Sheet 9
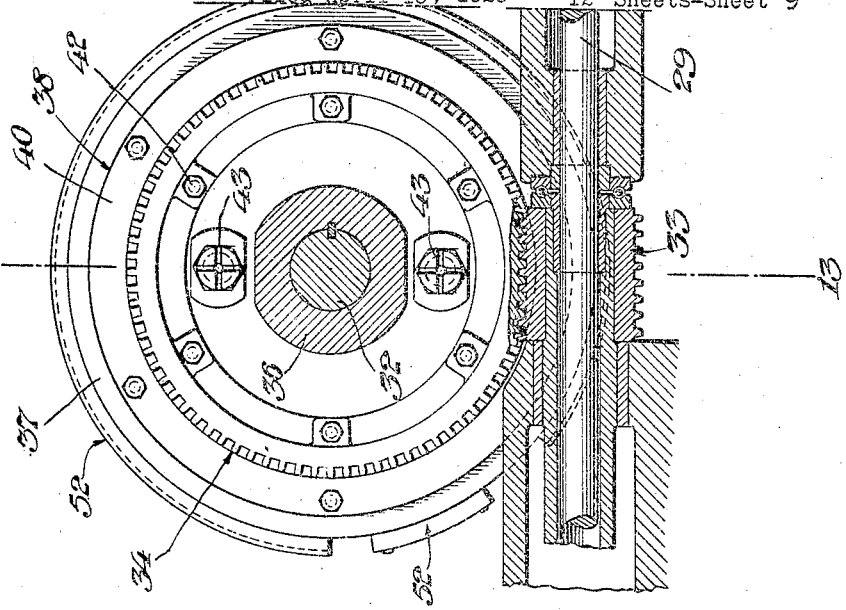
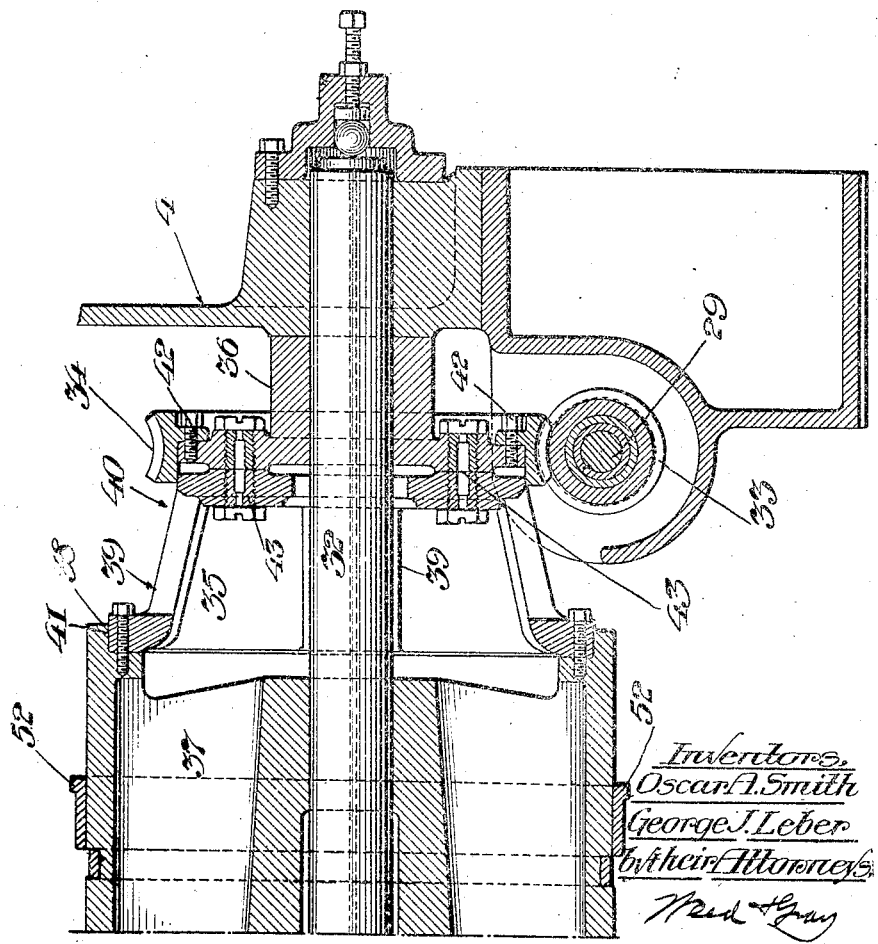
Inventors,
Oscar A. Smith
George J. Leber
by their Attorneys May 26, 1925.
O. A. SMITH ET AL
1,539,440
NUT FORMING AND DRILLING MACHINE
Filed April 13, 1923    12 Sheets-Sheet 10
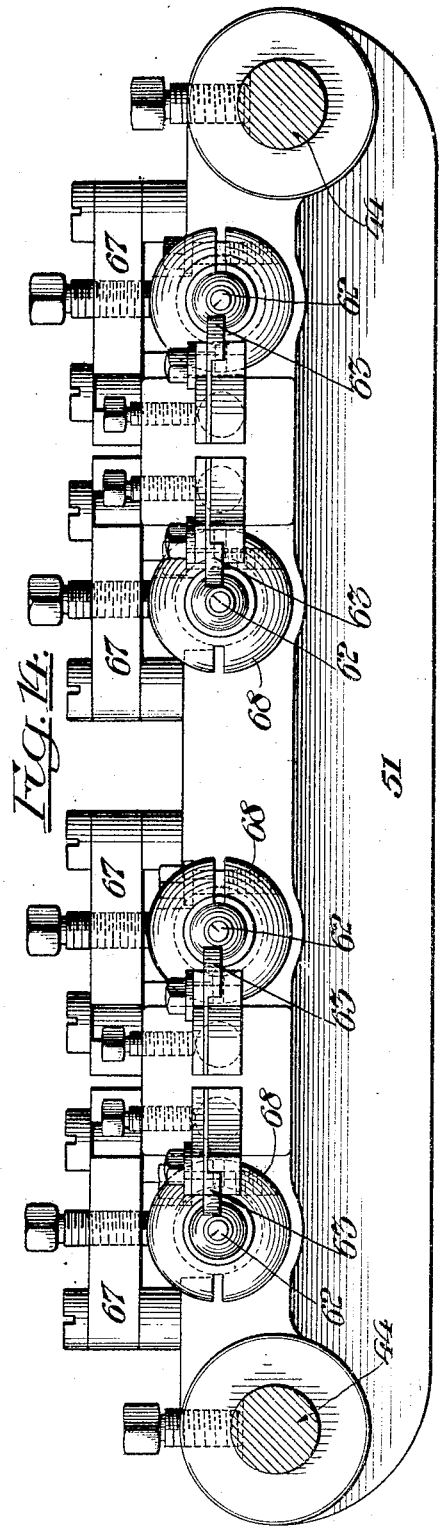
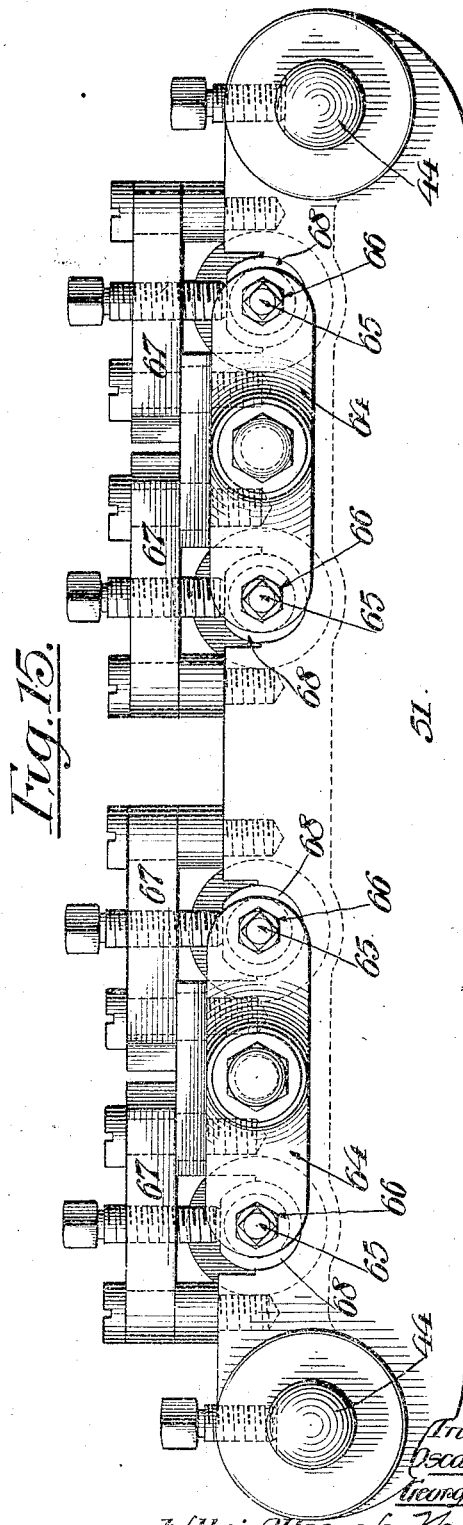

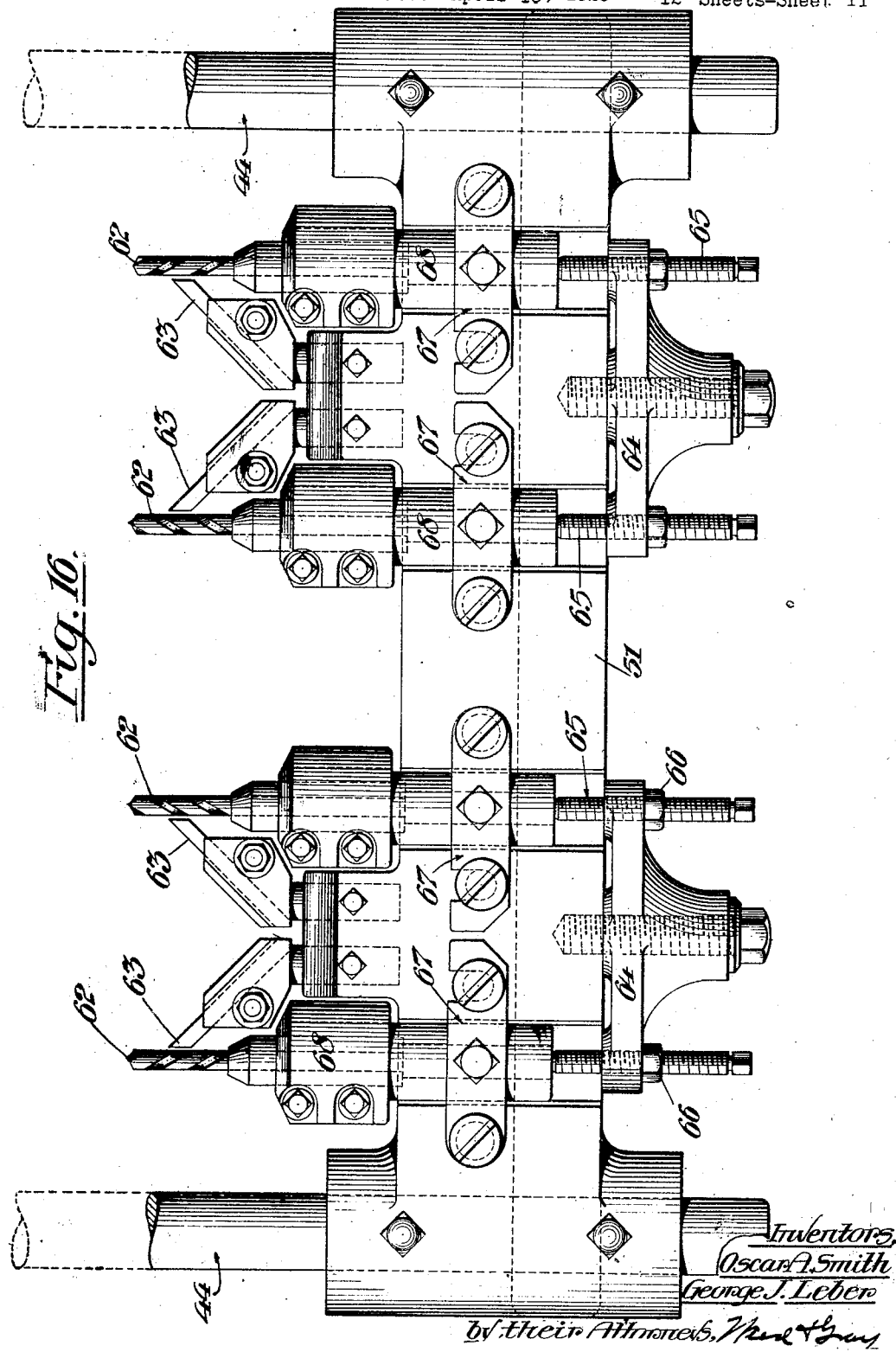

May 26, 1925.

O. A. SMITH ET AL 1,539,440

NUT FORMING AND DRILLING MACHINE

Filed April 13, 1923    12 Sheets-Sheet 12

Inventors.
Oscar A. Smith
George J. Leber
by their Attorneys,

Patented May 26, 1925.

1,539,440

UNITED STATES PATENT OFFICE.

OSCAR A. SMITH, OF EAST CLEVELAND, AND GEORGE J. LEBER, OF CLEVELAND, OHIO, ASSIGNORS TO THE NATIONAL ACME COMPANY, OF CLEVELAND, OHIO, A CORPORATION OF OHIO.

NUT FORMING AND DRILLING MACHINE.

Application filed April 13, 1923. Serial No. 631,759.

*To all whom it may concern:*

Be it known that we, OSCAR A. SMITH and GEORGE J. LEBER, both citizens of the United States, said SMITH residing at East Cleveland and said LEBER residing at Cleveland, both in the county of Cuyahoga and State of Ohio, have invented certain new and useful Improvements in Nut Forming and Drilling Machines, of which the following is a specification.

This invention relates to metal working machines, more particularly to what may be designated as a multiple spindle lathe, primarily constructed as a nut forming or blanking and drilling machine, and while capable of use for various kinds of work, is particularly adapted for manufacturing turned nuts, especially of large size, as steel nuts from 7/16 inch up, in which the nut blanks are chamfered, faced and crowned and also drilled.

The present machine is particularly well adapted for the manufacture of nuts made from the bar, or what is designated in the art as machine turned nuts, in which the blanking, namely the chamfering, facing and crowning are the most expensive operations performed on a castle or castellated or plain nut, and therefore it is essential to the economical manufacture of such nuts, that they be quickly and accurately produced.

The present machine is an improvement in part upon that shown and described in Patent No. 1,318,116 dated October 7, 1919, to Oscar A. Smith and the contemporaneously pending application of the same inventor Serial No. 510,412, filed October 26, 1921, and owned by the National Acme Company, the assignee of the present case, and which prior machines were particularly adapted to give increased production on small work or parts, such as battery nuts, running from 7/16 inch to ½ inch, and they proved to be very successful and the greatest producers of such sizes of nuts, but to adapt these machines for larger sizes of nuts from 7/16 inch up, especially when made of steel, not only required that the work spindles be much larger and the mechanism for operating the work spindles much heavier, but in order to increase the production of these machines, it also required an increased number of work spindles, all of which however, would require a materially greater width of machine.

Furthermore, an increase in the number of spindles located in horizontal parallelism would require two cam shafts instead of one, and this would very materially complicate all the auxiliary mechanisms and make it a very complicated machine, thereby greatly reducing its efficiency and practicability, and therefore it was found practically impossible to successfully operate more than six spindles in parallelism because of the complications in auxiliary mechanisms due to the necessity of an additional cam shaft. Therefore to increase the number of spindles and thereby the production of the machine without increasing the width of the machine or the number of cam shafts and auxiliary mechanisms, and at the same time enable the several parts to be made of larger size for the manufacture of larger sized nuts was the problem solved by the present improvement. The solution of this problem was the reorganization of the machine in such a way that an increased number of spindles could be utilized without increasing the width of the machine or the number of cam-shafts or the addition of auxiliary mechanisms, and this was accomplished by locating the work spindles, drills and forming tools instead of in parallelism, as in the prior application and patent, in angular or gable or A-shaped formation.

The object of the present improvement therefore, is the provision of a machine of the class described which, while capable of use for various kinds and sizes of work, is particularly adapted for use in the manufacture of nuts, such as steel nuts of large size, as for instance from 7/16 inch up, and in which the production of such nuts is materially increased.

The primary object of the present improvement is the provision of an improved machine having an increased number of work spindles without increasing the width of the machine, the number of cam shafts, or auxiliary mechanisms.

A further object of the invention is the provision of an eight-spindle machine of the class described, located in angular or gable formation with four spindles on each side of the machine and all operated by a single cam shaft and its mechanism.

A further object of the invention is the provision of an improved machine of the class described having two sets of work spindles, two sets of side tools and two sets of end tools all located in angular or gable formation in combination with a single cam shaft cooperating with certain of said mechanisms.

A further object of the invention is the provision of an improved machine having all the advantages of the machines hereinbefore referred to and the additional advantages of increased production, as well as the capability of manufacturing larger sized nuts and a reduction in the width of the machine and the simplification thereof.

In the drawings accompanying and forming a part of this specification, Fig. 1 is a view of one side of the machine; Fig. 2 is a view of the opposite side of the machine, or what may be considered as the controlled side of the machine; Fig. 3 is a longitudinal partly sectional view of the machine, certain of the parts of Fig. 1 being omitted, and the sections being taken more particularly on line 3—3 of Fig. 5; Fig. 4 is a view looking in the direction of the arrow 4, Fig. 1, in other words what may be considered as a front end view of the machine; Fig. 5 is the opposite end view of the machine looking in the direction of arrow 5, Fig. 1; Fig. 6 is a cross-sectional view taken on line 6—6 Fig. 1 looking in the direction of the arrows; Fig. 7 is a cross-sectional view taken on line 7—7 Fig. 1, looking in the direction of the arrows; Fig. 8 is a detail view illustrating the forming slides at one side of the machine; Fig. 9 illustrates the cam mechanism therefor; Fig. 10 illustrates the opposite forming slide mechanism; Fig. 11 illustrates the cam mechanism therefor; Fig. 12 is a cross-sectional view of the worm shaft and worm wheel mechanism for operating the cam shaft; Fig. 13 is a longitudinal sectional view taken on line 13—13 of Fig. 12 illustrating the safety connection between the worm wheel mechanism and the cam shaft; Fig. 14 is a front view of one set of end working tools and holders, in other words one of the drill slides; Fig. 15 is an opposite end view thereof; Fig. 16 is a top view of one of the drill slides with the drills and chamfering tools in position; and Fig. 17 is a partly sectional view illustrating one of the work spindles.

Similar characters of reference indicate corresponding parts in the several figures of the drawings.

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

In the preferred form thereof shown, this improved machine comprises a suitable pan 1 suitably supported, in which is mounted the bed or housing comprising the portions 2, 3, 3' and 4, all of gable or angular formation.

Forming tool slides.

To the front face of the portion 3 of the angular formed bed is bolted at suitable angles the forming tool slideways 5, and in these slideways are suitably housed the forming tool slides 6 (see Fig. 4). As the general construction of these slides and the tools carried thereby is the same as that shown and described in Patent No. 1,318,116 hereinbefore referred to and explained in detail, commencing on page 3, line 121, reference to that patent is made for a more particular description thereof.

Wedge operating mechanism.

To the rear face of that part of the bed carrying the slides just referred to is bolted likewise in angular formation the wedge sliding lever brackets 7 carrying the wedge operating levers 8, and as the construction thereof is substantially similar to those shown and described in said patent, reference thereto is made for a more particular description thereof, (see p. 4 commencing with l. 115).

Work spindle mechanism.

At a suitable distance below the forming slides 6 and at a suitable distance from each other, and in gable formation, are housed the work spindles 9, eight in number, being located in sets of four, one set at each side of the center of the machine. These spindles and their bearings are likewise similar to those shown and described in said patent, and therefore a detailed description thereof herein is not deemed necessary.

Located above and in parallel alinement with the work spindles, and likewise in gable formation, are rotatably housed auxiliary spindle drive shafts 10. Housed in a suitable gap 3" of the bed and keyed to these shafts so as to mesh with each other are helical gears 11, and these shafts and gears are held in position against endwise movement by suitable split spacing collars provided with suitable bolts and thrust washers, which are housed over the shafts between the collars and inner face of a bed frame.

In mesh with the two uppermost spiral gears, one at each side, is the main spindle drive gear 12 (see Fig. 2). This gear is keyed to the main drive shaft 13, which has its bearing in the bed portions 3 and 4. Keyed to this drive shaft 13 and resting against the inner face of the bed portion 4 is a miter gear 14. Secured to the work spindles are the work spindle gears 15, (see Fig. 6) and as there are four spindles on each side, there are likewise four gears on each side, the two lower gears on each side being in mesh with each other and the two upper gears on each side also being in mesh with each other. Mounted on a stud 16 at each side of the machine is an intermediate drive gear 17, which is in mesh with the two middle or the second and third gears of each set of four spindle gears, thereby to rotate these two middle gears, which in turn rotate their companion gears and thus drive the four work spindles. Each intermediate gear 17 is in mesh with a gear 18 carried by the lower spiral gear spindle or shaft 10, so that when the two sets of spiral gears 11 are driven the work spindles will be rotated. On top of the apex portion 2 of the gabled bed is suitably mounted a motor M provided with a spur gear 19, which meshes with a spur gear 20 mounted on the drive shaft 13, and in conjunction with suitable change gears 21 located between this spur gear 20 and the face of the bed provides the desired changes in speed for the work spindles. This change gear system is similar to that commonly used in National Acme machines, and therefore no further explanation thereof is deemed necessary herein since it will be obvious that when the motor is started the work spindles will be rotated through the medium of the spiral gears and cooperating gears at the desired speed.

*Worm and cam shaft mechanisms.*

Mounted in a vertical bearing at the inside face of the bed portion 4 (see for instance Figs. 2 and 6) is a vertical shaft 22 to the upper end of which is keyed a miter gear 23 in mesh with the miter gear 14 carried by the drive shaft 13 (see Fig. 2).

To the lower end of this shaft is a similar miter gear 24 in mesh with a similar gear 25 carried by an angularly located shaft 26 mounted in suitable bearings carried by the bed, these two shafts 22 and 26 forming intermediate shafts between the drive shaft 13 and the worm shaft hereinafter described. To the lower end of this shaft 26 is a miter gear 27 in mesh with a similar gear 28 mounted on the worm shaft 29.

As this worm shaft and its cooperating mechanism including the main change gears for varying the speed of the cam shaft are substantially identical with those shown and described in the patent hereinbefore referred to, a detailed description thereof is not deemed necessary herein, except to say that the change gears are shown at 30

(see Figs. 1 and 6) being located at one end of the worm shaft, while the controlling mechanism 31 for the machine (see Fig. 2) is located at the other end thereof.

Mounted in suitable bearings of the bed centrally thereof is a cam shaft 32 (see Fig. 3). This shaft has suitable end thrust bearings likewise similar to those shown and described in the patent hereinbefore referred to. Keyed adjacent to one end of this cam shaft 32 and in position to mesh with the worm 33 on the worm shaft is a worm gear 34. This worm gear is connected with one of the main cam drums of the cam shaft, as for instance what may be termed the "lead cam drum", which is effective to operate the drill slides. This connection thus forms a direct drive between the worm wheel 34 and the cam drum, and is in the form of safety mechanism 35 (see Fig. 13). This mechanism comprises means for driving the cam drum directly from the worm gear, and this from substantially the outer periphery of the worm gear to substantially the outer periphery of the cam drum. The cam drum 37 is mounted upon the cam shaft 32, being suitably keyed thereto, and also pinned thereto. This cam drum is counterbored at 38 to receive the outwardly flaring connecting members or arms 39 of the ring shaped member 40, the arms 39 being bolted to the cam drum as at 41.

The worm wheel 34 is shown comprising a hub portion 36 loosely mounted upon the cam shaft 32, while the worm wheel proper 34 comprises a bronze ring or rim having suitable teeth on its periphery adapted to mesh with the worm gear 33. This worm ring is suitably secured or bolted to a flange of the hub portion 36 as at 42. The flanged portion of the hub 36 is connected with the ring-shaped member 40 carrying the arms 39 by suitable safety devices or pins 43. Thus it will be seen that on the rotation of the worm shaft 29 the worm wheel 34 and its hub 36 loosely mounted on the cam shaft will be rotated, thereby to rotate through the medium of the safety pins the arms or bracket members 39, and thereby the cam drum 37, and thereby the cam shaft 32, thus forming a direct drive from the worm wheel mechanism to the cam drum, which rotates the cam shaft. This is thus the means that drives the cam shaft from the motor.

During the operation however, of the machine, in the event that a strain greater than the safety pins will stand is placed upon any part of the mechanism operated through the medium of the cam shaft, these pins will shear, and inasmuch as the sole connection between the worm wheel on the one hand and the cam drum on the other hand is through the medium of these safety pins, it follows that the worm wheel on the shearing of the pins may continue to rotate without imparting any motion to the cam drum or the cam shaft.

It is not necessary to describe herein in detail the cam drums and discs or the cams and cam straps carried by the drums, since the construction and purpose of these parts are well understood in machine shop practice, it being merely necessary to say that the particular shape and style of cam and cam strap necessary to accomplish the operation of the several mechanisms are used, as will be obvious, from the fact that the machine is a successfully operating one.

*Check spindle operating mechanism.*

In a suitable gap of the gable-formed bed below the work spindles are mounted in suitable bores the chucking slide bars 45, three on each side of the machine spaced a suitable distance apart and in parallelism with each other and with the work spindle. On these bars 45 are slidingly mounted the wedge locking slides 46, four in number, two on each side of the machine (see for instance Figs. 3, 5 and 7).

These slides are of a length sufficient to permit them to travel back and forth a predetermined distance on the slide bars 45. From an inspection of Fig. 7 it will be seen that these slides are so constructed at each side of the machine that each receives or has passing therethrough one of the three slide bars 45, while the middle slide bar 45 is received or passes through the pair of slides 46. In other words, the juxtaposed side faces of the pair of slides are semicircularly formed so that the middle pair 45 receives both slides, as at 47. Thus, the outer slide bars 45 on each side of the machine receive the full bore of the slides while the center of the three bars 45 receives approximately one-half of the circular bore of the two slides. To the lower faces of each pair of slides 46 are fastened suitable studs and rollers 48, one stud and roller for each slide, these rollers being located in such position as to come in contact with duplicate sets of cams 48' on a cam drum 49 carried by the cam shaft 32 at a predetermined time whereby the slides 46 will be shifted back and forth. The upper faces of the slides 46 are provided with suitable notches or depressions 50 (see Fig. 3) to receive the lower circularly formed ends of the wedge levers 8, and by this construction these wedge levers are operated to control the work spindle chucks.

*End working tool mechanism.*

In suitable bearings of the triangular or gable formed bed portion of the machine are slidingly housed the slide or pull rods or bars 44, by means of which the end forming tools, comprising in the present instance drills and facing tools are pulled into the work in the manner hereinafter described. These sliding pull rods or bars, four in number, are located in two sets or pairs, one pair at each side of the machine, and therefore two of the pull rods are located at a suitable distance above the work spindles and two below the work spindles.

Fastened to each pair of slide bars or pull rods 44 at the front end of the machine are a pair of end tool slides 51, one at each side of the machine in front of the work spindles and the side working or forming tool slides. Thus, as the work rods are fed through the work spindles from the rear of the machine toward the front thereof for the operation of the side working tools carried by the tool slides 6, they will be in position to be operated upon by the end working tools including the drills carried by the drill slides. This pair of drill slides, each fastened to a pair of pull rods 44, are likewise located in gable or A-shaped formation corresponding with the location of the work spindles, there being one drill for instance for each work spindle.

The construction of these end working tool slides is in the main substantially similar to the construction of those set forth and described in the prior application and patent hereinbefor ref ed to, and therefore a detailed description thereof is not deemed necessary herein, it being merely necessary to say that each slide is provided with semicircular bores, into which are housed the drill holders 68, which are secured in position by suitable means, as posts and straps 67, and these drill holders carry a part of the end working tools, as the drills 62. Suitable bores, two in number, are also provided in the front face of each slide, these bores being located midway between each pair of drills, and at a suitable distance away from the drills. In these bores are housed the chamfering or facing tools 63. To the rear face of each drill slide is fastened stop brackets 64, so secured as to allow them to swing, and these stop brackets are provided with adjusting screws 65 and adjusting nuts 66, against which the drill holders carrying the drills rest when in proper position. Two sets of suitable cams 52 on the cam drum 37 carried by the cam shaft 32 cooperate with suitable studs and rollers 53 carried by a pair of feed and drill or end working tool slides 54 likewise located in gable formation, each secured at each side of the machine to a pair of pull rods 44, and thus shift the end working tools toward and from the work spindles, thereby to pull the end working tools into the work, which is a very desirable and advantageous feature. These slides 54 also control the feeding of the rods to the work spindles and as they are substantially similar in construction and operation to the slides shown and described in said patent and application, a further description thereof is unnecessary herein. It is understood of course, that the location and timing of the cams are such that the several mechanisms will operate in the proper sequence.

*Side working tool operating mechanism.*

Mounted in the bed at a suitable distance below the side tool or forming slides 6, and at each side of the machine, are a pair of slide operating lever shafts 55 (see Figs. 3, 8 and 10), and adjacent to one end of each of these shafts is secured slide operating levers 56. The upper ends of these levers are extended and formed, as at 57 to engage suitable formed stations or recesses 58 in extended portions 59 of the side tool forming slides 6, while the lower ends of these levers 56 are provided with suitable studs and rollers in position to be engaged by suitable cams or cam discs 60 and 61, one cam disc for each pair of levers at a side of the machine, and by this means the side tools are reciprocated back and forth and are likewise pulled into the work, which is of material advantage. These operating levers 56 and slides operate in the same manner shown and described in the patent hereinbefore referred to.

Suitable stop mechanism for the work carried by the spindle may be used, if desired, and this may be of any suitable form or similar to that shown and described in said Patent No. 1,318,116, and therefore a detailed description thereof is not deemed necessary herein.

The machine is provided with the usual pump and oil mechanism and stock bar rack or reel for supporting and guiding the stock bars to the work spindles.

From the foregoing it will be seen that, notwithstanding the increased size of the machine and the working parts to adapt the machine to large work, and notwithstanding the increased number of work spindles and tools, the construction is such that the spindles and tools are located in a very small space, making it possible to use only one cam shaft and also possible, notwithstanding the increased size of the parts and the additional work spindles, to materially reduce the size or width of the machine, even for large work, and also making it possible to operate the machine much easier and making it handier to get at.

Furthermore, the present construction provides for a center drive, since the motor is located on top of the machine centrally of the width thereof, whereas in the prior machines hereinbefore referred to, the motor was at the side of the machine and therefore the drive was not a central one. These are but some of the additional advantages for the present improved machine, and all of which make for increased and more economical production of the product, as well as more accurate results.

It will be observed that the side forming tool cam mechanism, the end working tool cam mechanism, and the chuck operating tool mechanism for the work spindles are each duplicates, and are located, as it were, one behind the other on the cam shaft, one of each controlling its operated parts at one side of the machine, while the other controls its operated parts at the other side of the machine, and that as hereinbefore stated, the side working tools, the end working tools, the work spindles and the several slides and operating mechanisms controlled by the cam shaft are all located in gable formation with the side working tools in gable or triangular formation above the gable formation of the end working tools and work spindles, which improved construction, as hereinbefore stated, makes possible an additional number of work spindles and cooperating tools, consequently an increased production of product, while at the same time reducing the width or size of the machine, and also makes possible the use of a single cam shaft mechanism and a central drive located, as it were, at the apex of the machine.

It is to be understood that by describing in detail herein any particular form, structure, or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. In a metal working machine, the combination of a supporting frame of gable section, work spindles, end working tools and side forming tools located on two of the faces of said supporting frame whereby they are in gable formation, and means for operating them.

2. In a metal working machine, the combination of a supporting frame of gable section, work spindles, end working tools and side forming tools located on two of the faces of said supporting frames, and means for operating them, the side forming tools being located above the plane of the end working tools and work spindles.

3. In a metal working machine, the combination of two sets of work spindles located in gable formation, means for rotating them, two sets of end working tools in alinement therewith and likewise located in gable formation, two sets of side forming tools also located in gable formation above the plane of the work spindles, and means for operating them.

4. In a metal working machine, the combination of at least eight work spindles located in gable formation in sets of four, a similar number of end working tools and side forming tools, each located in gable formation in sets of four, and means for operating them.

5. In a metal working machine, the combination of two sets of work spindles located in gable formation, means for rotating them, two sets of end working tools in alinement therewith and likewise located in gable formation, two sets of side forming tools also located in gable formation above the plane of the work spindles, a single cam shaft, and mechanism cooperating therewith for controlling the end working and side working tools.

6. In a metal working machine, the combination of two sets of work spindles located in gable formation, means for rotating them, two sets of end working tools in alinement therewith and likewise located in gable formation, two sets of side forming tools also located in gable formation above the plane of the work spindles, a single cam shaft and mechanism cooperating therewith for controlling the end working and side working tools and located below the work spindles and end working tools.

7. In a metal working machine, the combination of two sets of work spindles located in gable formation, two sets of end working tools in alinement therewith and likewise located in gable formation, two sets of side forming tools also located in gable formation above the plane of the work spindles, a single cam shaft and mechanism cooperating therewith for controlling the end working and side working tools, and a centrally located driving mechanism for rotating the work spindles and cam shaft.

8. In a metal working machine, the combination of two sets of work spindles located in gable formation, two sets of end working tools in alinement therewith and likewise located in gable formation, two sets of side forming tools also located in gable formation above the plane of the work spindles, a single cam shaft and mechanism cooperating therewith for controlling the end working and side working tools, and a centrally located driving mechanism for rotating the work spindles and cam shaft, said driving mechanism having its source of power located at the apex of the machine.

9. In a metal working machine, the combination of two sets of work spindles located in gable formation, means for rotating them, two sets of end working tools in alinement therewith and likewise located in gable formation, two sets of side forming tools also located in gable formation above the plane of the work spindles, a single cam shaft, and mechanism cooperating therewith for controlling the end working and side working tools, said cam shaft being located below the work spindles and in parallelism with the spindle rotating means, and means operated by said spindle rotating means for rotating said cam shaft.

10. In a machine of the class described, the combination of a supporting frame of gable section, end working tools and side forming tools, each located on two of the faces of said supporting frame one above the other whereby they are in gable formation, and means for operating them.

11. In a metal working machine, the combination of a supporting frame of gable section, end working tools located on two of the faces of said supporting frame whereby they are in gable formation, and means for operating them.

12. In a metal working machine, the combination of a supporting frame of gable section, a plurality of parallelly located working tools arranged on each of two of the faces of said supporting frame, and means for operating them.

13. In a metal working machine, the combination of a supporting frame of gable section, two sets of end working tools located on two of the faces of said supporting frame and means for pulling them into the work.

14. In a machine of the class described, the combination of a supporting frame of gable section and work spindles arranged on two of the faces of said supporting frame.

15. In a metal working machine, the combination of a supporting frame of gable section, and work spindles and tools located on two of the faces of said supporting frame.

16. In a metal working machine, the combination of a supporting frame of gable section, a plurality of parallelly located side working tools located on each of two of the faces of said supporting frame, and means for operating them.

17. In a metal working machine, the combination of a supporting frame of gable section, two sets of four side working tools located on each of two of the faces of said supporting frame, and means for operating them.

18. In a metal working machine, the combination of a supporting frame of gable section, two sets of sliding side working tools located on two of the faces of said frame, and means for pulling them into the work.

19. In a metal working machine, the combination of two sets of end working tools located in gable formation, and two sets of work spindles likewise located in gable formation and in alinement with the end working tools, and means for operating them.

20. In a metal working machine, the combination of two sets of end working tools located in gable formation, two sets of work spindles likewise located in gable formation and in alinement with the end working tools, and means for operating them thereby to pull the end working tools into the work.

21. In a metal working machine, the combination of two sets of end working tools and two sets of side forming tools, both located in gable formation, and means for operating them.

22. In a metal working machine, the combination of two sets of end working tools and two sets of side forming tools, both located in gable formation, and means for operating them, the side working tools being located above the end working tools.

23. In a metal working machine, the combination of two sets of end working tools and two sets of side forming tools, both located in gable formation, means for operating them, the side working tools being located above the end working tools, and means for pulling both sets of tools into the work.

24. In a metal working machine, the combination of two sets of work spindles located in gable formation, and two sets of side forming tools likewise located in gable formation, and means for operating them.

25. In a metal working machine, the combination of two sets of work spindles located in gable formation, two sets of side forming tools likewise located in gable formation, and means for operating them, the side forming tools being located above the work spindles.

26. In a metal working machine, the combination of a supporting frame of gable section, a plurality of work spindles, and a plurality of sets of tools located on two of the faces of said supporting frame, and means for operating them.

27. In a metal working machine, the combination of a plurality of work spindles and a plurality of sets of tools all located in gable formation, and centrally located means for operating them.

28. In a metal working machine, the combination of a plurality of work spindles located in gable formation, a plurality of sets of tools likewise located in gable formation, a single cam shaft mechanism for controlling the operation of said tools, and a centrally located driving mechanism for operating the work spindles and rotating the cam shaft.

29. In a metal working machine, the combination of a plurality of work spindles located in gable formation, a plurality of sets of tools likewise located in gable formation, a single cam shaft mechanism for controlling the operation of said tools, and a centrally located driving mechanism for operating the work spindles and rotating the cam shaft, said driving mechanism having its source of power located at the apex of the machine.

30. In a metal working machine, the combination of a plurality of work spindles located in gable formation, a plurality of sets of tools likewise located in gable formation, a single cam shaft mechanism for controlling the operation of said tools, and a centrally located driving mechanism for operating the work spindles and rotating the cam shaft, said driving mechanism having its source of power located at the apex of the machine and said cam mechanism being located in parallelism therewith.

31. In a metal working machine, the combination of a gable formed bed and work spindle and tool mechanism carried thereby in gable formation, and means for operating said mechanisms.

32. In a metal working machine, the combination of a gable formed bed and a plurality of sets of tool mechanisms located in gable formation one above the other, and a plurality of work spindles located in gable formation in alinement with one of said tool mechanisms, and means for operating them.

33. In a metal working machine, the combination of a gable formed bed and a plurality of sets of tool mechanisms located in gable formation one above the other, a plurality of work spindles located in gable formation in alinement with one of said tool mechanisms, means for operating them, and comprising cam shaft mechanism within the gable formed bed, and a driving mechanism located at the apex of the bed and connected with the cam shaft mechanism.

34. In a metal working machine, the combination of a gable formed bed, a plurality of sets of end working tools carried by said bed, a plurality of sets of side working tools also carried by said bed above the plane of the end working tools, a plurality of sets of work spindles carried by the bed in alinement with the end working tools, a cam shaft mechanism located within the gable formed bed, driving mechanism located at the apex of the gable formed bed, and a transverse worm shaft mechanism connecting said driving mechanism with the cam shaft mechanism.

35. In a metal working machine, the combination of a gable formed bed, a plurality of sets of end working tools carried by said bed, a plurality of sets of side working tools also carried by said bed above the plane of the end working tools, a plurality of sets of work spindles carried by the bed in alinement with the end working tools, a cam shaft mechanism located within the gable formed bed, driving mechanism located at the apex of the gable formed bed, a transverse worm shaft mechanism connecting said driving mechanism with the cam shaft mechanism, and two sets of gable located driving gears connected with the driving mechanism at the apex of the bed for rotating said work spindles.

36. In a metal working machine, the combination of a gable formed bed, a plurality of sets of end working tools carried by said bed, a plurality of sets of side working tools also carried by said bed above the plane of the end working tools, a plurality of sets of work spindles carried by the bed in alinement with the end working tools, a cam shaft mechanism located within the gable formed bed, driving mechanism located at the apex of the gable formed bed, a transverse worm shaft mechanism connecting said driving mechanism with the cam shaft mechanism, and two sets of change speed gears connected one with the worm shaft for controlling the speed of the cam shaft and the other with the driving mechanism for controlling the speed of the work spindles.

37. In a metal working machine, the combination of a plurality of sets of end working tools, side working tools and rotatable work spindles, the several sets being triangularly located, and means for supporting them, means for reciprocating the end working tools, means for rotating the work spindles, and means for reciprocating the side working tools, said side working tools being shiftable downwardly toward each other to perform their work and upwardly away from each other when the work is finished.

38. In a metal working machine, the combination of a plurality of sets of end working tools, side working tools and rotatable work spindles, the several sets being triangularly located, and means for supporting them, means for reciprocating the end working tools, means for rotating the work spindles, and means for reciprocating the side working tools, said side working tools being shiftable downwardly toward each other to perform their work and upwardly away from each other when the work is finished, said last means including a single cam shaft mechanism located in the gap between said side working tools and effective to shift the same.

39. In a metal working machine, the combination of a plurality of sets of end working tools, side working tools and rotatable work spindles, the several sets being triangularly located, and means for supporting them, means for reciprocating the end working tools, means for rotating the work spindles, means for reciprocating the side working tools, said side working tools being shiftable downwardly toward each other to perform their work and upwardly away from each other when the work is finished, said last means including a single cam shaft mechanism located in the gap between said side working tools and effective to shift the same, and a plurality of sets of operating levers cooperating with the side forming tools and with the cam shaft mechanism.

40. In a metal working machine, the combination of a plurality of sets of end working tools, side working tools and rotatable work spindles, the several sets being triangularly located, and means for supporting them, means for reciprocating the end working tools, means for rotating the work spindles, means for reciprocating the side working tools, said side working tools being shiftable downwardly toward each other to perform their work and upwardly away from each other when the work is finished, said last means including a single cam shaft mechanism located in the gap between said side working tools and effective to shift the same, and a plurality of sets of operating levers cooperating with the side forming tools and with the cam shaft mechanism, a pair of said levers crossing each other.

41. In a metal working machine, the combination of a plurality of sets of end working tools, side working tools and rotatable work spindles, the several sets being triangularly located, and means for supporting them, means for reciprocating the end working tools, means for rotating the work spindles, and means for reciprocating the side working tools, said side working tools being shiftable downwardly toward each other to perform their work and upwardly away from each other when the work is finished, said last means including a single cam shaft mechanism located in the gap below said side working tools and effective to shift the same and said spindle rotating means including a driving shaft located in the gap above said side working tools.

42. In a metal working machine, the combination of a plurality of sets of end working tools, side working tools and rotatable work spindles, the several sets being triangularly located, and means for supporting them, means for reciprocating the end working tools, means for rotating the work spindles, means for reciprocating the side working tools, said side working tools being shiftable downwardly toward each other to perform their work and upwardly away from each other when the work is finished, said last means including a single cam shaft mechanism located in the gap below said side working tools and effective to shift the same and said spindle rotating means including a driving shaft located in the gap above said side working tools, said driving shaft and cam shaft being located in parallelism, and a motor located above and connected with said driving shaft.

43. In a metal working machine, the combination of a plurality of sets of end working tools, side working tools and rotatable work spindles, the several sets being triangularly located, and means for supporting them, means for reciprocating the end working tools, means for rotating the work spindles, means for reciprocating the side working tools, said side working tools being shiftable downwardly toward each other to perform their work and upwardly away from each other when the work is finished, said last means including a single cam shaft mechanism located in the gap below said side working tools and effective to shift the same and said spindle rotating means including a driving shaft located in the gap above said side working tools, said driving shaft and cam shaft being located in parallelism, a motor located above and connected with said driving shaft, a transverse worm shaft, means connected with the driving shaft for rotating said worm shaft, and means connecting the worm shaft and cam shaft.

44. A gable formed metal working machine comprising duplicate sets of mechanisms located in gable formation, and means for operating the same and including a cam shaft mechanism having duplicate sets of cam mechanisms.

45. A gable formed metal working machine comprising duplicate sets of mechanisms located in gable formation, and means for operating the same and including a cam shaft mechanism having duplicate sets of cam mechanisms, the cams of each set being located one behind the other.

46. A gable formed metal working machine comprising a gable formed main bed, end working tools and work spindles located in gable formation thereon, a gable formed extension above the main bed, a plurality of sets of triangularly located side working tools carried by said extension, and means for operating the several sets of spindles and tools.

47. A gable formed metal working machine comprising duplicate sets of mechanisms located in triangular formation, and means for operating them and including a motor at the apex of said machine.

48. A gable formed metal working machine comprising duplicate sets of mechanisms located in triangular formation, means for operating them and including a motor at the apex of said machine, one of said sets of mechanisms comprising rotary work spindles, and means operated by the motor for rotating them and including spiral gears.

49. A gable formed metal working machine comprising duplicate sets of mechanisms located in triangular formation, means for operating them and including a motor at the apex of said machine, one of said sets of mechanisms comprising rotary work spindles, and means operated by the motor for rotating them and including spiral gears located in triangular formation.

50. A gable formed metal working machine comprising duplicate sets of mechanisms located in triangular formation, and means for operating them and including a cam shaft, a worm shaft, a motor, and means connecting said motor with the worm shaft.

51. In a metal working machine, the combination of a gable formed bed, two pairs of sliding rods located in gable formation thereon, means for operating said rods, and tools operated by said rods.

52. In a metal working machine, the combination of a gable formed bed, two pairs of sliding rods located in gable formation thereon, means for operating said rods, and tools operated by said rods, said tools comprising end working tools likewise located in gable formation.

53. In a metal working machine, the combination of a gable formed bed, work spindles carried thereby, means for operating the work spindles, means for controlling the work spindles, end working tools, and two pairs of sliding rods located in the bed in triangular form for operating said tools and the spindle controlling mechanism.

54. In a metal working machine, the combination of a gable formed bed, rotary work spindles carried thereby in triangular formation, and triangularly located gears for imparting motion to the work spindles.

55. In a metal working machine, the combination of a gable formed bed, two sets of triangularly located rotating chuck spindles, and means for operating them and including gable located chuck operating mechanism.

56. In a metal working machine, the combination of a gable formed bed, two sets of work spindles located in triangular formation on said bed, wedge lever mechanism likewise located in triangular formation on said bed, and means for operating said wedge lever mechanism.

57. In a metal working machine, the combination of rotary work spindles, means for rotating them, wedge lever mechanism cooperating with the spindles, a slide for operating said wedge lever mechanism, and a cam shaft for operating said slide.

58. In a metal working machine, the combination of rotary work spindles, means for rotating them, wedge lever mechanism cooperating with the spindles, a slide for operating said wedge lever mechanism, and a cam shaft for operating said slide, said spindles, wedge lever mechanism and slide mechanism being located in gable formation on the bed.

59. In a metal working machine, the combination of a gable formed bed supporting portion, sliding side forming tools located in triangular form thereon, a cam shaft, two sets of auxiliary shafts located in triangular formation, and levers mounted on said auxiliary shafts and operated by said cam shaft.

60. In a metal working machine, the combination of a gable formed bed supporting portion, sliding side forming tools located in triangular form thereon, a cam shaft, two sets of auxiliary shafts located in triangular formation, and levers mounted on said auxiliary shafts and operated by said cam shaft, a pair of said levers crossing each other.

61. In a metal working machine, the combination of a gable formed bed supporting portion, sliding side forming tools located in triangular form thereon, a cam shaft, two sets of auxiliary shafts located in triangular formation, and levers mounted on said auxiliary shafts and operated by said cam shaft, a pair of said levers crossing each other and operative through the medium of two sets of cam members located one behind the other on said cam shaft.

62. A gable formed metal working machine comprising a supporting frame of gable section and duplicate sets of parallelly located mechanisms located on each of two of the faces of said frame and means for operating certain of said mechanisms.

63. A gable formed metal working machine comprising duplicate sets of mechanisms located in triangular formation, means for operating them and comprising in part a cam shaft, and duplicate sets of cams thereon, one set behind the other.

64. A gable formed metal working machine comprising duplicate sets of mechanisms located in triangular formation, and means for operating them and including a cam shaft, a cam drum fixed thereto, driving mechanism, a worm shaft, a worm wheel loose on the cam shaft, and safety mechanism between the worm wheel and cam drum and forming a direct drive from one to the other.

65. A gable formed metal working machine comprising duplicate sets of mechanisms located in triangular formation, means for operating them and including a cam shaft, a cam drum fixed thereto, driving mechanism, a worm shaft, a worm wheel loose on the cam shaft, and safety mechanism between the worm wheel and cam drum and forming a direct drive from one to the other, said safety mechanism including shearable pins.

66. In a metal working machine, the combination of a pair of tool slides located in triangular formation, means for operating them, two pairs of drills carried by each of said slides, and end forming tools located between each pair of drills.

67. A gable formed metal working machine comprising duplicate sets of mechanisms located in triangular formation and including work spindles, means for operating the several sets of mechanisms, and means located in triangular formation for feeding the work through the spindles.

68. In a metal working machine, the combination of a gable formed bed, a cam shaft, a motor at the apex of the bed, a driving shaft in parallelism with the cam shaft, a transverse worm shaft, a pair of intermediate shafts connecting the driving shaft and the worm shaft, two sets of triangularly located side working tools, two sets of triangularly located end working tools, means operated by the cam shaft for reciprocating the end and side working tools, and means operated by the driving shaft for rotating the work spindles.

69. In a metal working machine, the combination of a gable formed bed, a cam shaft, a motor at the apex of the bed, a driving shaft in parallelism with the cam shaft, a transverse worm shaft, a pair of intermediate shafts connecting the driving shaft and the worm shaft, two sets of triangularly located side working tools, two sets of triangularly located end working tools, means operated by the cam shaft for reciprocating the end and side working tools, and means operated by the driving shaft for rotating the work spindles and including two sets of triangularly located spiral gears.

70. In a metal working machine, the combination of an A-formed bed comprising duplicate sets of mechanisms located in A-formation thereon, and means for operating them.

71. In a metal working machine, the combination of an A-formed bed comprising duplicate sets of mechanisms located in A-formation thereon, means for operating them and comprising a cam shaft located between the legs of the A, and driving mechanism located adjacent to the apex of the A.

72. In a metal working machine, the combination of a gable formed bed, duplicate sets of mechanisms located in triangular formation thereon, and means for operating them and including a single cam shaft and a single driving shaft.

73. In a metal working machine, the combination of a gable formed bed, duplicate sets of mechanisms located in triangular formation thereon, means for operating them and including a single cam shaft and a single driving shaft, and means connecting said shafts and including change speed mechanism.

74. In a metal working machine, the combination of a gable formed bed, duplicate sets of mechanisms located in triangular formation thereon, means for operating them and including a single cam shaft and a single driving shaft, and means connecting said shafts and including change speed mechanism from the driving shaft and change speed mechanism to the cam shaft.

75. In a metal working machine, the combination of a gable formed bed, duplicate sets of mechanisms located in triangular formation thereon, means for operating them and including a cam shaft, a driving shaft, and duplicate sets of slide mechanisms located in triangular formation for operating certain of said mechanisms.

76. In a metal working machine, the combination of a gable formed bed, duplicate sets of mechanisms located in triangular formation thereon, means for operating them and including a cam shaft, a driving shaft, duplicate sets of slide mechanisms located in triangular formation for operating certain of said mechanisms, and duplicate sets of cams carried by the cam shaft for operating said slide mechanisms.

77. In a metal working machine, the combination of a gable formed bed, duplicate sets of mechanisms located in triangular formation thereon, means for operating them and including a single cam shaft and a single driving shaft, and means connecting said driving shaft and cam shaft and including safety mechanism.

78. In a metal working machine, the combination of a gable formed bed, duplicate sets of mechanisms located in triangular formation thereon, means for operating them and including a single cam shaft and a single driving shaft, and means connecting said driving shaft and cam shaft and including a worm shaft, a worm wheel, and safety mechanism between said worm wheel and cam shaft.

79. In a metal working machine, the combination of a gable formed bed, two sets of triangularly located sliding side working tools, two sets of triangularly located rotary chuck carrying work spindles below said side working tools, two sets of triangularly located end working tools in alinement with said work spindles, a motor carried at the apex of said bed, a driving shaft in parallelism with the motor, gearing connecting the motor and driving shaft, triangularly located sets of gears between the driving shaft and the work spindles for rotating them, change speed gearing for varying the speed of the work spindles, a single cam shaft in parallelism with and below the driving shaft, means connecting the driving shaft with the cam shaft and including change speed mechanism for varying the speed of the cam shaft, means operative from the cam shaft for reciprocating the end working tools, means operative from the cam shaft for reciprocating the side working tools, means operative from the cam shaft for controlling the operation of the work spindle chucks, and means operative from the cam shaft for feeding the work through the spindles from the rear end to said work spindle chucks.

80. In a metal working machine, the combination of a centrally located driving mechanism and a centrally located cam shaft mechanism, one above the other, and work spindles and tool carrying means located at each side of the vertical plane of the axes of said cam shaft mechanism and driving mechanism.

81. In a metal working machine, the combination of a centrally located driving mechanism and a centrally located cam shaft mechanism, one above the other, and work spindles and tool carrying means located at each side of the vertical plane of the axes of said cam shaft mechanism and driving mechanism and in triangular formation.

82. In a metal working machine, the combination of a centrally located driving mechanism and a centrally located cam shaft mechanism, one above the other, and work spindles and tool carrying means located at each side of the vertical plane of the axes of said cam shaft mechanism and driving mechanism and in triangular formation and comprising two sets of inclinedly located work spindles, two sets of inclinedly located side forming tools and two sets of inclinedly located end working tools.

83. In a metal working machine, the combination of a plurality of sets of each located in inclined planes, work spindles and cooperating tools, and means for operating them.

84. In a metal working machine, the combination of a plurality of work spindles, a plurality of side forming tools and a plurality of end forming tools, each located in inclined planes and means for operating them.

85. In a metal working machine, the combination of a single centrally located cam shaft mechanism, a single centrally located main driving shaft, a set of work spindles, and a set of tools adapted to cooperate with the work in the work spindles, each set located in inclined planes.

86. In a metal working machine, the combination of a single centrally located cam shaft mechanism, a single centrally located main driving shaft, a set of work spindles, and two sets of tools adapted to cooperate with the work in the work spindles, each set located in inclined planes.

87. In a metal working machine, the combination of a single centrally located cam shaft mechanism, a single centrally located main driving shaft, a set of work spindles, and two sets of inclinedly located tools adapted to cooperate with the work in the work spindles and one comprising side forming tools and the other end working tools, each set located in inclined planes.

Signed at Cleveland, Ohio, this 9th day of April, 1923.

OSCAR A. SMITH.
GEORGE J. LEBER.